United States Patent [19]

Wightman et al.

[11] 4,160,152
[45] Jul. 3, 1979

[54] HEATING UNIT

[76] Inventors: John W. Wightman, 201 E. Norman Dr., Palatine, Ill. 60067; Lawrance W. Wightman, 3 Ridgecreek, St. Louis, Mo. 63141

[21] Appl. No.: 966,015

[22] Filed: Dec. 4, 1978

[51] Int. Cl.² .............................................. F27D 11/02
[52] U.S. Cl. .................................. 219/438; 219/430; 219/433; 219/435; 219/441; 219/463; 219/521; 338/225 D; 99/444
[58] Field of Search .................. 99/447, 444; 219/214, 219/386, 429, 430, 432, 433, 434, 435, 436, 438, 439, 441, 442, 459, 460, 463, 464, 521, 530, 540; 338/225 D

[56] References Cited

U.S. PATENT DOCUMENTS

| | | | |
|---|---|---|---|
| 3,514,579 | 5/1970 | Sanders | 219/430 |
| 3,519,798 | 7/1970 | Walther | 219/439 |
| 3,720,807 | 3/1973 | Ting | 219/441 |
| 3,778,594 | 12/1973 | Wightman | 219/430 |
| 3,876,861 | 4/1975 | Wightman et al. | 219/463 |
| 3,909,592 | 9/1975 | Eide | 219/462 |
| 3,987,275 | 10/1976 | Hurko | 219/461 |
| 4,049,949 | 9/1977 | Fitzsimmons | 219/430 X |
| 4,072,091 | 2/1978 | Richardson | 219/433 X |

Primary Examiner—Volodymyr Y. Mayewsky
Attorney, Agent, or Firm—Polster, Polster and Lucchesi

[57] ABSTRACT

A heating unit is provided in the form of an open topped container with a side wall and a bottom. The side wall has a plurality of bosses each of which has a plate-receiving groove. The bottom has on its upper surface elongated seat defining flanges, a barrier wall projecting between and extending laterally beyond a pair of seat defining flanges to separate the seats and to separate a pair of wires, and labyrinth walls defining a strain-relief circuitous wire passage. A pair of spring terminals are provided, each having a U-shaped part defined by two divergent leg parts one of which is seated in one of the seats and the other of which extends upwardly away from the bottom to a free end. A disc of PTCR material is mounted on the spaced free ends. A plate is snapped into the plate-receiving grooves of the bosses. The disc is forced by the plate to compress the terminal legs against their spring bias to hold the disc in snug electrical and mechanical contact with the terminal legs, and to hold the terminals against upward movement by the disc and sideways movement by the terminal seat-defining flanges.

11 Claims, 11 Drawing Figures

HEATING UNIT

BACKGROUND OF THE INVENTION

The device that is the subject of the present invention is an improvement upon the heating unit of U.S. Pat. No. 3,876,861 in respect of its simplicity, and ease and economy of manufacture.

SUMMARY OF THE INVENTION

In accordance with this invention, generally stated, a heating unit is provided comprising an open topped container having a side wall and a bottom. A plurality of bosses on the inside surface of the side wall each has a plate-receiving groove. The bottom has elongated seat defining flanges on its upper surface, a barrier wall projecting between and extending laterally beyond a pair of facing seat defining flanges to separate the seats and to separate a pair of wires, labyrinth walls defining a strain-relief circuitous wire passage, one end of which communicates with an opening through the container and the other with the seats, said barrier wall having a disc-locating shoulder and said labyrinth walls serving therewith as disc locating means.

A pair of spring terminal contacts each has a U-shaped part defined by two divergent leg parts, one of which is seated in one of the seats and the other of which extends upwardly away from the bottom to a free end, the free ends of the two terminal contacts being spaced from one another. A pair of electrical conductors having an insulating sheath intermediate their ends are electrically connected at one end to the seated legs of the terminal contacts. The conductors are separated adjacent that end by the barrier wall. The conductors lie within the passage defined by the labyrinth walls and extend through the opening in the container.

A disc of PTCR material is mounted on and in electrical contact with the spaced free ends of the upwardly extending terminal legs. A plate, shaped complementarily to the inside of the side wall is of a size to snap into the plate-receiving grooves of the bosses. The labyrinth and barrier walls are of a height to support the plate when it is caged within the grooves of the bosses, and preferably, a thin sheet of insulation, mounted between the top of the disc and the bottom of the plate, requires the plate to be distorted slightly to clear the top groove-defining shoulder. The height of the grooves above the bottom, the height of the terminal legs and the thickness of the disc is such as to cause the disc to compress the terminal legs against their spring bias whereby the disc is held in snug electrical and mechanical contact with the terminal legs, and the terminals are held against upward movement by the disc and sideways movement by the terminal seat-defining flanges.

DESCRIPTION OF THE PREFERRED EMBODIMENT

Figure 1:
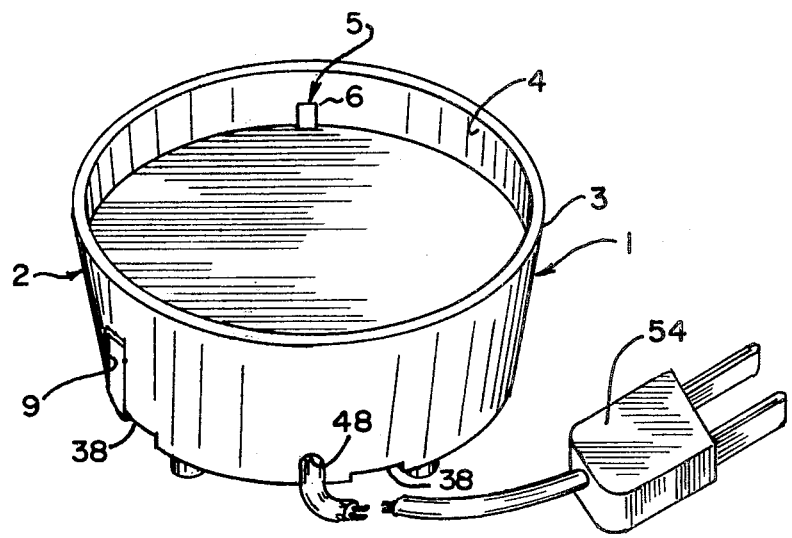
FIG. 1 is a view in perspective of one embodiment of heating unit of this invention.
Figure 2:
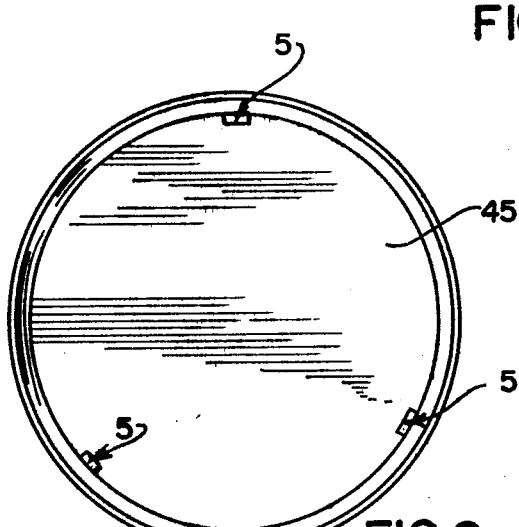
FIG. 2 is a top plan view of the unit shown in FIG. 1.
Figure 3:
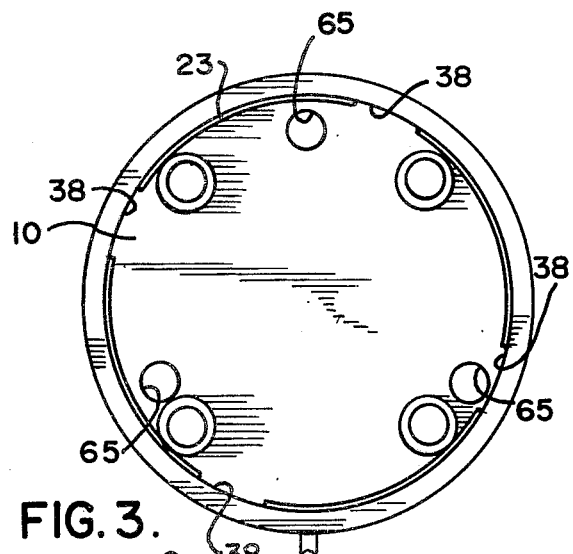
FIG. 3 is a bottom plan view.

Referring now to the drawing for one illustrative embodiment of heating unit of this invention, reference numeral 1 indicates a fully assembled unit, which includes a container 2 having a side wall 3 and a bottom 10, spring terminal contacts 30, a PTCR disc 40 and a heat-conducting cover plate 45.

Figure 5:
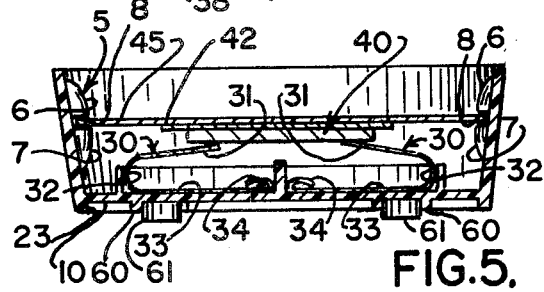
FIG. 5 is a sectional view taken along the line 5—5 of FIG. 4.
Figure 8:
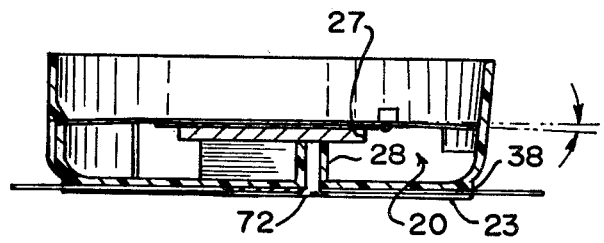
FIG. 8 is a sectional view taken along the line 8—8 of FIG. 4, but showing a slightly modified form.

The side wall 3 of the container slopes convergently downwardly, as shown in FIGS. 1, 5 and 8, and is provided on an inside surface 4 with bosses 5. In FIG. 8, the side is shown as having a radius near its lower edge. In both versions a lower rim or apron 23 extends from the side wall below the bottom 10. The apron 23 has notches 38 at four quadrants. The bosses 5 have hemiogival upper parts 6 terminating in planar surfaces, and shoulder-defining lower parts 7, defining between them a plate-receiving groove 8 extending in a direction parallel with the bottom and all lying in the same plane. In the illustrative embodiment shown, the container is made of plastic, and the lower boss parts 7 are formed by deforming the side wall inwardly, producing a recess 9 in the outside surface of the side wall, and the shouldered lower part 7 in the inner surface.

In this embodiment, the bottom 10 has formed integral with it seats 11 defined by side flanges 12, 13, 14 and 15, and end flanges 16 and 17. The side flanges 12 and 13 are continuous, being formed in their center part integral with reinforcing ribs 18. The side flanges 14 and 15 terminate short of one another.

A barrier wall 20 projects laterally across and beyond the side walls 14 and 15, separating the two seats 11, and in its end 21, serving as a separator for a pair of conductors. The barrier wall also serves as a support for the cover plate 45 and, by virtue of a step, as shown in FIG. 8, provides a locating shoulder 27 for the disc 40. The stepped portion ends short of the inner surface of the side wall 3, as shown in FIG. 8.

Also integral with the bottom, in this embodiment, are strain-relief passage defining labyrinth walls 24, 25 and 26. In this embodiment, the walls 24 and 25 extend above the bottom surface of the disc 40 but below its top surface, and thus cooperate with the disc-locating shoulder 27 to provide three points of location for the disc during the assembly process.

The portions of the walls which extend inboard of the disc 40 when it is mounted are of substantially less height than the distance of the undersurface of the disc 40 from the bottom, as shown in FIG. 5.

The terminal contacts are made of stiffly springy material which is also a good electrical conductor. In this embodiment, each consists of a U-shaped part defined by an upper leg 31, a root 32, and a lower leg 33, which is longer than the upper leg 31, and ends in a conductor mounting bight 34. As shown in FIG. 5, the free ends of the upper legs 31 are spaced apart a greater distance than the bight ends of the lower legs, and incline divergently outwardly from the bottom.

The PTCR disc 40 is mounted in electrical and mechanical contact with the free ends of the upper legs 31. A sheet of electrical insulation 42 is mounted on the top surface of the disc 40.

The plate 45 is mounted in the groove 8, with the thin sheet of insulation 42 sandwiched between its lower surface and the upper surface of the disc 40.

Figure 4:
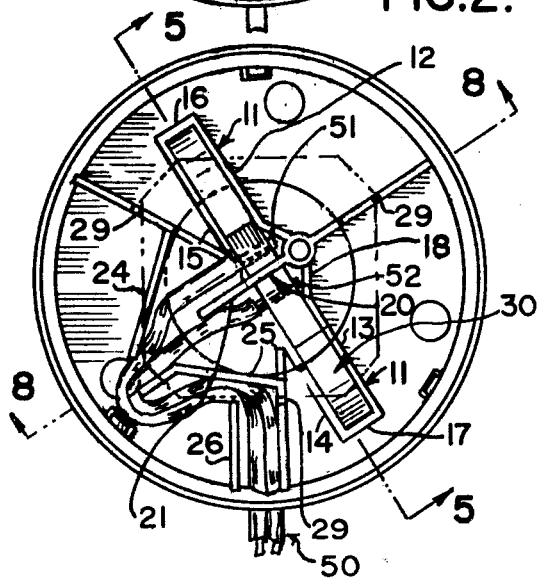
FIG. 4 is a top plan view with the top plate removed, and insulation and a PTCR disc shown in phantom lines, showing the arrangement of internal walls, terminal contacts and electrical conductors.
Figure 6:
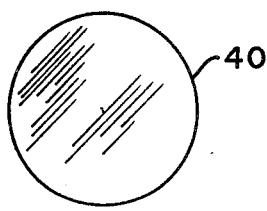
FIG. 6 is a top plan view of PTCR disc.
Figure 7:
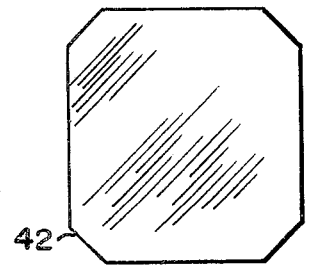
FIG. 7 is a top plan view of a sheet of electrical insulation.

The conductors 50 are carried in a sheath of insulation intermediate their ends. At one end, they are connected to a conventional plug 54. At their other end, the insulated sheath is divided for a distance, as shown in FIG. 4, and ends 51 and 52 of the conductors are stripped of insulation and secured in respective bights 34 of the terminal-contacts 30. The divided insulated portions of the conductors 50 straddle and are separated by the parallel wall 20. The undivided cord immediately following the divided portion is seated between the labyrinth walls 24 and 25, and 25 and 26, as shown in FIG. 4, to form a strain-relief loop internally of the container, so as to meet UL requirements.

In the embodiment shown, the lower surface of the bottom has, made integral with it, annular rims 60 defining feet-receiving sockets, in which feet 61 are seated. Drain holes 65 extending all the way through the bottom, permit any liquid which may accidentally be spilled onto the top plate 45 and makes its way around the edges of the plate down the side wall 4, to escape.

Figure 9:
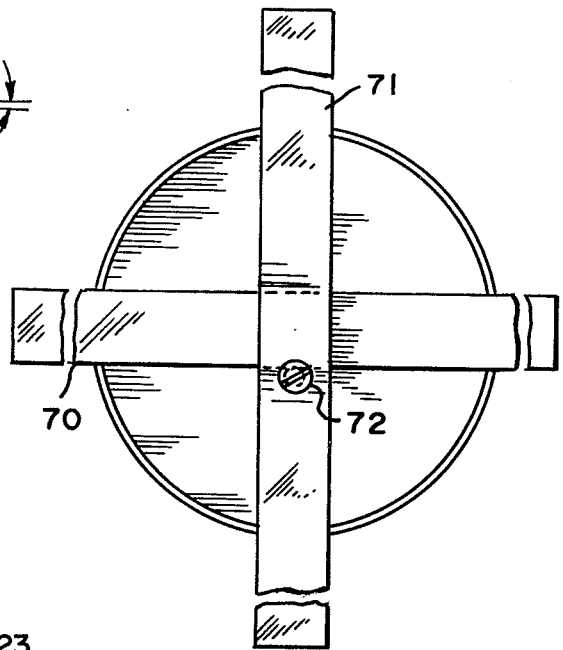
FIG. 9 is a bottom plan view of the embodiment of device shown in FIG. 8.
Figure 10:
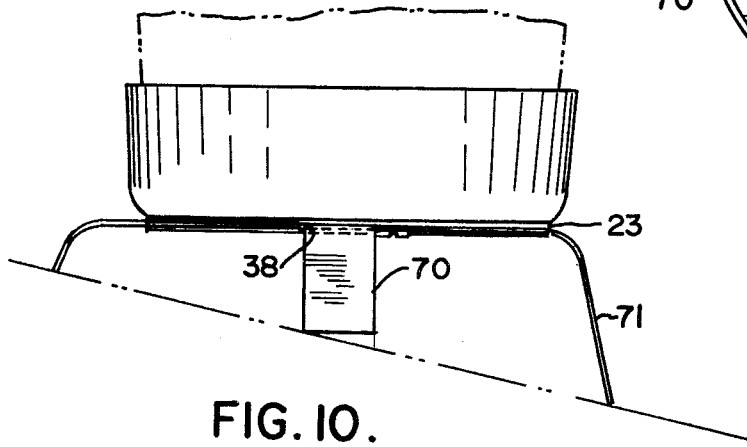
FIG. 10 is a view in side elevation of the device shown in FIG. 9, with mounting means shown adapted to mount the device on the gear box hump of an automobile.
Figure 11:
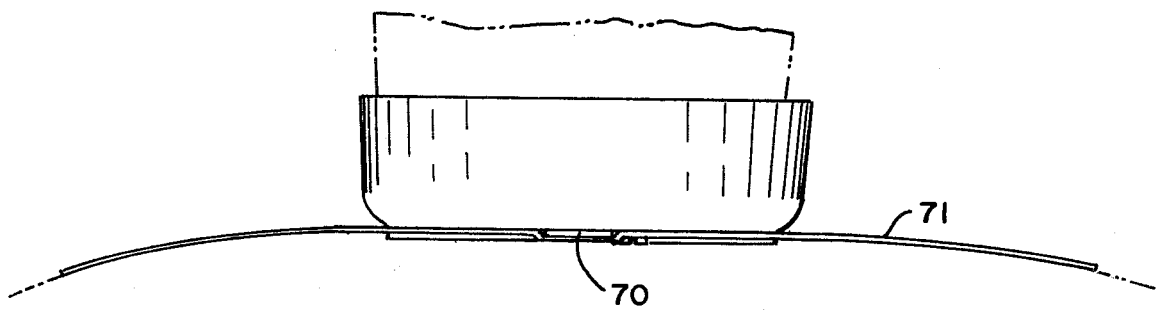
FIG. 11 is a view in side elevation showing the mounting means adapted for use with an automobile console.

A screw-receiving boss, integral with the reinforcing ribs 18, has a hole in it which extends through the bottom 10. As shown in FIGS. 9-11, strips 70 and 71, of stiffly bendable material can be mounted on the bottom 10 by means of a tapping screw 72 to extend through the notches 38. They are bent to accommodate various mounting surfaces in an automobile, for example.

In assembling the heating unit, the conductor ends 51 and 52 can be led through a conductor passage 48 in the lower part of the side wall 3 of the container, and can be crimped into the bights 34 of the terminal-contacts 30, and the terminal-contacts can then be seated in the seats 11 of the open-topped container 2. The cord can then be pressed down into the labyrinth passages as shown in FIG. 4.

The disc 40 is then placed on top of the legs 31, which at that time hold the disc 40 above the upper margin of the groove 8, within the compass of the shoulders 27. The thin sheet of electrically insulative, heat conductive material, such as Nomex or Kapton (product of E. I. DuPont de Nemours Co.), is placed on top disc 40, its positioning being aided by the provision of guide nicks 29 in the barrier and labyrinth walls as shown in FIG. 4. The plate 45 is pushed down against the bias of the springy legs 31 until the plate bottoms on the upper edges of the barrier and labyrinth walls and the edge of the disc may be deflected downwardly slightly until the plate snaps into the grooves 8.

In the preferred embodiment shown, the plastic material of which the container 2 is made has sufficient resilience to permit the upper parts of the bosses 5 to be temporarily forced outboardly of the plate, and to spring back when the plate is within the confines of the groove. The plate itself, which can be made of thin aluminum or stainless steel, can be momentarily deformed somewhat by pressing on its edges, so as to permit or facilitate the plate's clearing the upper parts of the bosses.

It can be seen that the plate can also be notched to clear the parts 6 of the bosses, and then rotated to move an unnotched part of the plate into the groove. In this arrangement, one or more burrs or lips can be struck out of the plane of the edge, to serve as stops to limit or inhibit the subsequent rotation of the plate.

Numerous variations in the construction of the heating unit or assembly of this invention, within the scope of the appended claims, will occur to those skilled in the art in the light of the foregoing disclosure. Merely by way of example, a separate bottom, resting upon an inwardly projecting annular shoulder, can be provided. The specific arrangement of ribs and labyrinth walls can be varied, and separate shoulder-defining ribs. While the container 2 has been shown as circular in plan, it can assume other shapes. The ends of the legs 31 of the terminal contacts 30 can be bent or otherwise formed to provide broader electrical and mechanical contact with the undersurface of the disc 40. The disc itself can be of various shapes and sizes, and of various compositions. A suitable type is disclosed in our U.S. Pat. No. 3,876,861, but other suitable PTCR elements are available commercially. The PTCR materials can be selected to permit the operation of the device on 12 volts D.C., so as to permit the heating element to be energized by an automobile battery. These are merely illustrative.

Having thus described the invention, what is claimed and desired to be secured by Letters Patent is:

1. A heating unit comprising an open-topped container having a side wall and a bottom; a plurality of bosses on the inside surface of said side wall, each of said bosses having a plate-receiving groove extending in a direction parallel with said bottom and all lying in the same plane; elongated terminal seat-defining flanges on the upper surface of said bottom; a barrier wall projecting between and extending laterally beyond a pair of facing seat-defining flanges to separate said seats and to separate a pair of wires; labyrinth walls defining a strain-relief circuitous wire passage one end of which communicates with an opening through said container and the other with said seats; a pair of spring terminal contacts each having a U-shaped part defined by two divergent leg parts one of which is seated in one of said seats and the other of which extends upwardly away from said bottom to a free end, the free ends of the two terminals being spaced from one another; a pair of electrical conductors having an insulating sheath intermediate their ends, and electrically connected at one end to the seated legs of said terminal-contacts, said conductor being separated adjacent said ends by said barrier wall, lying within the passage defined by said labyrinth walls and extending through said opening in said container; a disc of PTCR material mounted on and in electrical contact with said spaced free ends of said upwardly extending terminal legs; a plate, shaped complementarily to the inside of said side wall and of a size to extend into the plate-receiving grooves of the said bosses, the height of the said grooves above the bottom, the height of the terminal-contact legs, and the thickness of the disc being such as to cause the disc to compress the terminal legs against their spring bias, whereby the disc is held in snug electrical and mechanical contact with the terminal legs, and the terminals are held against upward movement by the disc and sideways movement by the terminal seat-defining flanges.

2. The unit of claim 1 wherein the said plate is of electrically conductive material and a thin sheet of electrical insulation is interposed between the upper face of the disc and the lower face of the plate.

3. The unit of claim 1 wherein the bottom is provided with drain holes.

4. The unit of claim 1 in which the container is made of plastic and wherein a lower part of the bosses is formed by deforming the side wall inwardly to produce a recess in the outer surface and a shouldered boss part in the inner surface thereof.

5. The unit of claim 1 wherein the container is made of plastic and all of the side wall, bottom, bosses, terminal seat-defining flanges, barrier wall and labyrinth walls are integral.

6. The unit of claim 5 including rims defining feet-receiving sockets, integral with the lower, outside, wall of the bottom.

7. The unit of claim 1 wherein the inner surface of the said side wall has downwardly convergent slope.

8. The unit of claim 1 wherein ribs, integral with said bottom, define disc-locating shoulders, said ribs beyond said shoulder being of a height less than the height of the surface of the upper face of the disc in the course of assembly, but above the surface of the lower face of the disc.

9. The unit of claim 1 wherein the combined height of the terminal seat defining flanges and labyrinth walls and of the thickness of the plate is substantially the same as the height from the bottom to the upper groove defining surface of the bosses, whereby the plate is supported by said flanges and walls.

10. The unit of claim 1 including means fastened to said bottom for mounting said container on an irregular surface.

11. The unit of claim 1 in which an apron extends from said side wall below said bottom, said apron having spaced notches in it and said bottom having a fastener-receiving passage, and seating strips, mounted by a fastener projecting into said passage, extend along and outboard of said bottom through said notches.

* * * * *